J. V. WHITBECK.
TIRE CARRIER.
APPLICATION FILED APR. 9, 1914.
1,309,268.
Patented July 8, 1919.
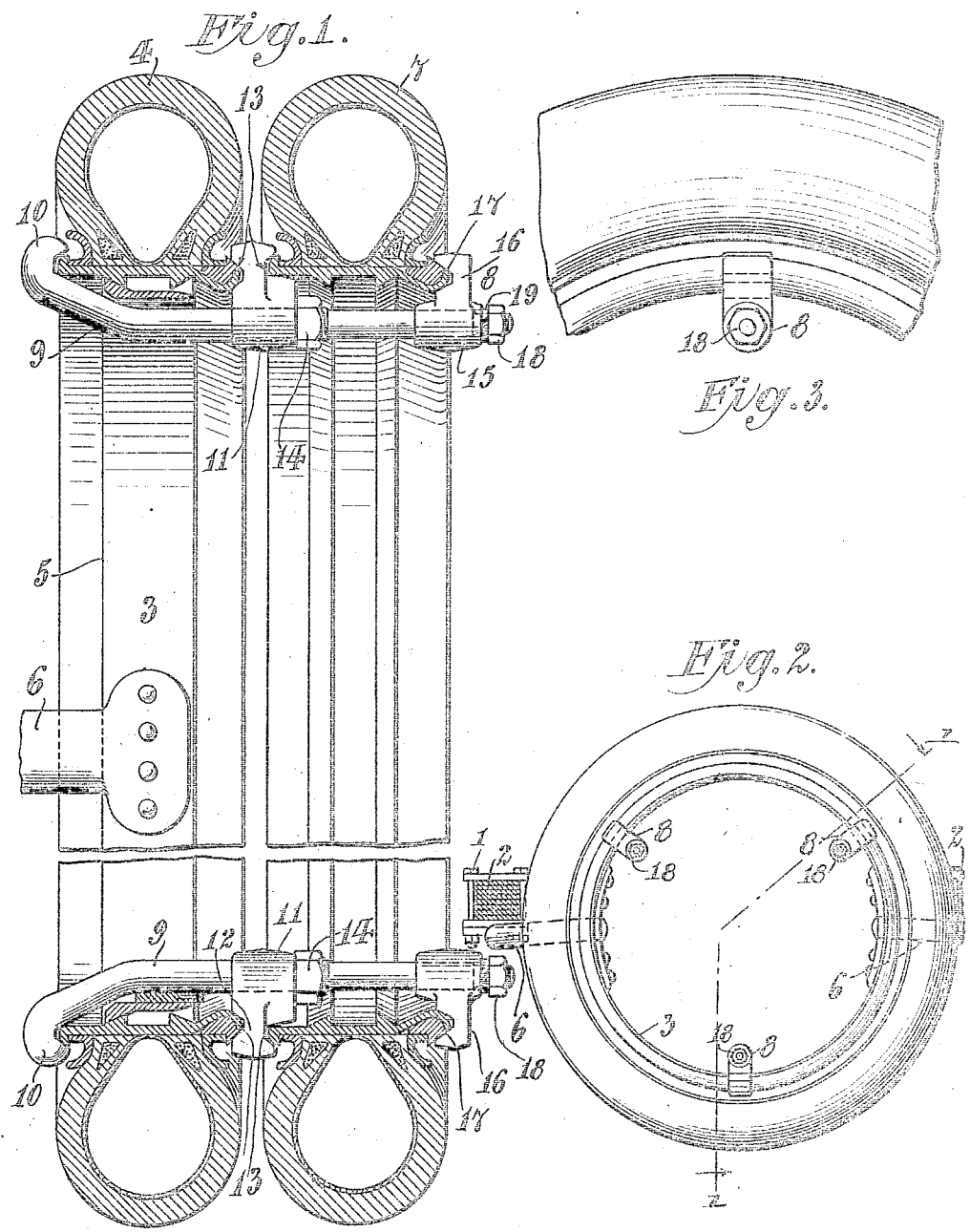

UNITED STATES PATENT OFFICE.

JOHN V. WHITBECK, OF CLEVELAND, OHIO, ASSIGNOR TO CHANDLER MOTOR CAR COMPANY, OF CLEVELAND, OHIO, A CORPORATION OF OHIO.

TIRE-CARRIER.

1,309,268.  Specification of Letters Patent.  Patented July 8, 1919.

Application filed April 8, 1914. Serial No. 830,321.

*To all whom it may concern:*

Be it known that I, JOHN V. WHITBECK, a citizen of the United States, residing at Cleveland, county of Cuyahoga, State of Ohio, have invented certain new and useful Improvements in Tire-Carriers, of which the following is a specification.

My invention relates to a tire carrier particularly where one or more extra tires are carried at the back of a motor vehicle body, and relates particularly to detachable means for carrying a plurality of tires from a single tire support.

It has been known in devices of this character to provide a means for supporting one or more tires in position on the vehicle, but when a number of tires, less than the number for which the device is designed, is carried, the supporting devices for these additional tires frequently project from the vehicle and present an unattractive and unfinished appearance.

Accordingly it is one of the objects of the invention to provide a demountable carrier for the additional tire or tires which carrier may be conveniently and quickly attached to the fixed tire support, the tire carried thereby, or to other suitable support.

Another object of the invention is to provide a clamping device for engaging the clencher rims of two or more tires to hold the same in braced position relative to each other and at the same time to avoid any engagement with the compressible or other parts of the tire which might be damaged by the engagement therewith of a clamping device.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

Referring to the accompanying drawings:—

Figure 1 is a vertical sectional view through a preferred embodiment of my invention taken substantially on the line 1—1 of Fig. 2.

Fig. 2 is a rear elevation of the device shown in Fig. 1 somewhat reduced in size, and Fig. 3 is a fragmentary portion of a side of the outer tire adjacent one of the holding devices.

In the drawings, there is illustrated a suitable support 1 which may be a vehicle indicated symbolically by the spring suspension 2. A fixed tire support 3, adapted to carry a tire 4, hereinafter for convenience referred to as the inner tire, is carried by the suspension 2 and is arranged so that no portion of the support projects beyond the outlines of the tire carried thereby. This support may comprise a tire engaging member in the form of a ring 5 and a pair of brackets 6, such as is described in my copending application No. 819,880, filed February 18, 1914.

With the particular form of device illustrated, the tires are shown to be of the straight edge rim type and in order to position the outer or additional tire 7 by the side of the tire 4, one or more, preferably three, demountable clamps 8 are inserted through the alined central openings in the tires to engage the rims thereof at points 120° from each other and to project therefrom for a distance sufficient to support one or more tires. The clamps each comprise a rod 9 having a hooked end 10 adapted to engage the inner edge of the rim of the inner tire 4. A sleeve 11 is slidably mounted on the rod and has a lateral extension 12, opposite sides of which have recesses 13 adapted to contain the adjacent rim edges of the two tires. The sleeve 11 is held against the inner tire by means of the nut 14 which is threaded on the rod 9 intermediate its length and engages the sleeve on the side thereof opposite the hook 10.

An outer sleeve 15 is slidably mounted on the rod 9 between the nut 14 and the end of the rod thereof opposite the hook. This sleeve 15 also has a lateral extension 16 with a notched face 17 adapted to contain the outer rim edge of the additional tire 7. The sleeve 16 maintains the outer tire in engagement with the sleeve 12 and is in turn locked in position by means of the nut 18 threaded on the rod 9. The nut may bear directly on the sleeve 16 but preferably a spring washer 19 is disposed between the sleeve 16 and the nut 18 so as to minimize the possibility of crushing the tire rim should the nut be turned up tight.

In operation, the inner tire may be carried as has been described in the above identified copending application or in any other suitable manner. When it is desired to mount an additional tire in position one or more of the rods 9 are positioned through the opening in the tire, the hooks 10 are caused to engage the inner edge of the rim and the sleeves 11 are drawn up until they engage the opposite edge, in which position the inner tire is locked by the nuts 14. An additional tire 7 is positioned on the clamps with the inner edge of its rim engaging the recesses in the sleeves 11 and the outer sleeves are drawn up into engagement with the outer edge thereof, in which position the outer tire is locked by the nuts 18.

Two tires have been shown, but it is obvious that the rod 9 may be made as long as necessary and any suitable number of sleeves 12 disposed along the length of this rod to hold a plurality of tires.

While the clamp has been described in detail in its connection with the inner tire, it is obvious that it may engage any other suitable support and it is obvious that one or any number of clamps may be used, the invention being drawn broadly to a demountable support for the additional tire or tires.

By means of a device of this character, but one extra tire support need be carried on the vehicle, or all tire supports whatsoever may be omitted when desired, and the clamp used only when it is desired to carry extra tires.

A clamp of the character illustrated may be advantageously used to maintain the tires in position side by side and braced apart relative to each other forming a unit which may be conveniently stored or mounted in the carrying position described.

Such a clamp does not encircle the compressible part of the tires, thus relieving these members from any binding action which might damage them. The strains incidental to holding the tires in place are confined to the wooden or metal rims and to the portion of the same having the greatest dimension and capacity to resist any crushing effect of these clamps. At the same time there is provided a braced structure comprising any number of tires arranged so that no one of them is subjected to any damaging strains.

Further, by means of a device of this character, the unsightly appearance of projecting rods and parts are eliminated when the device is carrying a less number of tires than the maximum for which the support was designed.

While I have shown and described, and have pointed out in the annexed claim, certain novel features of my invention, it will be understood that various omissions, substitutions and changes in the form and details of the device illustrated and in its operation may be made by those skilled in the art without departing from the spirit of the invention.

Having thus described my invention, I claim:—

A demountable tire carrier for supporting one tire from another tire, comprising a rod substantially circular in cross-section and having a hooked end adapted to engage an edge of the supporting tire and a sleeve receiving end, an inner sleeve slidably mounted on said rod and adapted to be positioned any place along the straight length thereof thereby to accommodate supporting tires of different thicknesses between the sleeve and the hooked end, said sleeve provided with means on opposite sides thereof for engaging the adjacent edges of both the supporting and the supported tires, a nut threaded on the rod for holding said sleeve from movement away from said hooked end, an outer sleeve slidably mounted on said rod between the inner sleeve and the sleeve receiving end of the rod and adapted to coact with the inner sleeve to hold the supported tire therebetween and a nut threaded on the rod for holding said outer sleeve in its tire holding position.

This specification signed and witnessed this 6th day of April, 1914.

JOHN V. WHITBECK.

Witnesses:
F. C. CHANDLER,
C. A. CAREY.